US006718225B2

(12) United States Patent
Nicole

(10) Patent No.: US 6,718,225 B2
(45) Date of Patent: Apr. 6, 2004

(54) DEVICE FOR CONTROLLING A MACHINE FOR CUTTING BLANKS FROM A SHEET MATERIAL

(75) Inventor: Marc Nicole, Renens (CH)

(73) Assignee: Bobst S.A. (CH)

( * ) Notice: Subject to any disclaimer, the term of this patent is extended or adjusted under 35 U.S.C. 154(b) by 142 days.

(21) Appl. No.: 09/855,063

(22) Filed: May 14, 2001

(65) Prior Publication Data

US 2001/0042426 A1 Nov. 22, 2001

(30) Foreign Application Priority Data

May 16, 2000 (CH) .............................................. 0962/00

(51) Int. Cl.[7] ................................................ G06F 19/00

(52) U.S. Cl. ......................... 700/160; 700/95; 700/169; 700/179; 700/180; 700/186; 700/187

(58) Field of Search ................................ 700/187, 186, 700/171, 169, 179, 134, 135, 95, 159, 160

(56) References Cited

U.S. PATENT DOCUMENTS 4,604,083 A * 8/1986 Barny et al. .................. 493/34
5,462,511 A * 10/1995 Sheldon et al. ................ 483/1
5,701,251 A * 12/1997 Yoshimura .................. 700/187
5,917,726 A * 6/1999 Pryor .......................... 700/95
5,953,232 A * 9/1999 Blaimschein ............... 700/171
5,956,253 A * 9/1999 Gottschalk .................. 700/186

* cited by examiner

*Primary Examiner*—Leo Picard
*Assistant Examiner*—Charles Kasenge
(74) *Attorney, Agent, or Firm*—Ostrolenk, Faber, Gerb & Soffen, LLP

(57) ABSTRACT

The machine controlled by the device comprises a set of cutting tools interchangeable in dependence on the blank to be cut, means adjustable in dependence on the jobs to be performed by each tool, and means for actuating the adjustable means. The control device comprises a memory (1) associated with each cutting tool in order to store the data relating to the characteristics of the tool and of the operations for adjusting the machine (5) in order to use the tool, reading means (2) for reading the data in the said memory, means (3) for displaying a menu relating to the data and control means (4) for generating and transmitting control signals (6, 7, 8) to the actuating means in dependence on the menu.

20 Claims, 2 Drawing Sheets

DEVICE FOR CONTROLLING A MACHINE FOR CUTTING BLANKS FROM A SHEET MATERIAL

The invention relates to a control device for a machine for cutting blanks from a sheet material, the machine comprising a set of cutting tools interchangeable in dependence on the blanks to be cut, means adjustable in dependence on the jobs to be done by each tool, and means for actuating the adjustable tools.

Cutting machines of this kind are generally used for constructing box blanks from cardboard sheets, the boxes being subsequently completed by folding the blanks. A number of kinds of blank can therefore be produced by a single cutting machine. Whenever a blank is changed, a new cutting tool must be positioned. The change is accompanied by multiple adjustment procedure associated with the shape and dimensions of the new blank, together with the specific accompanying operations. All the operations required on this occasion are entered in check lists for ensuring that all required adjustments have been made before the machine is restarted.

The machines are generally controlled from a data-processing console, so that the adjustment operations consist in inserting the various parameters, a long process which is also a source of errors.

The object of the invention is to obviate the said disadvantages, at least partly.

To this end the invention relates to a control device for a machine for cutting blanks from a sheet material as described herein.

In addition to information for identifying the tool and adjusting the machine, the memory can contain information relating to operations for maintaining the tool and the machine. For example the memory can record the length of use of the tool or the number of blanks made by the tool and indicate when the tool has to be sharpened or other operations are required for maintenance, service or checks on the machine. In other words the associated memory is a sort of identity card associated with the machine.

In the memory displayed on the screen of the control device, some adjustment operations can be automatically performed by the machine whereas other adjustments have to be initiated by the operator himself, depending on the information read. He can then check the screen to see whether all the adjustments have been made and whether the adjusted values correspond to the values recorded in the memory. He can of course modify the variable values and store the new value.

Advantageously the memory comprises a chip associated with a card similar to a credit card, bearing information identifying the particular reference of the tool associated with the card. The memory chip can also be mounted on a tool on the machine. Hereinafter we shall use the term "memory" to denote the memory support or holder, of whatever kind.

The accompanying drawings illustrate an embodiment, diagrammatically and by way of example, of the control device according to the invention.

Figure 1:
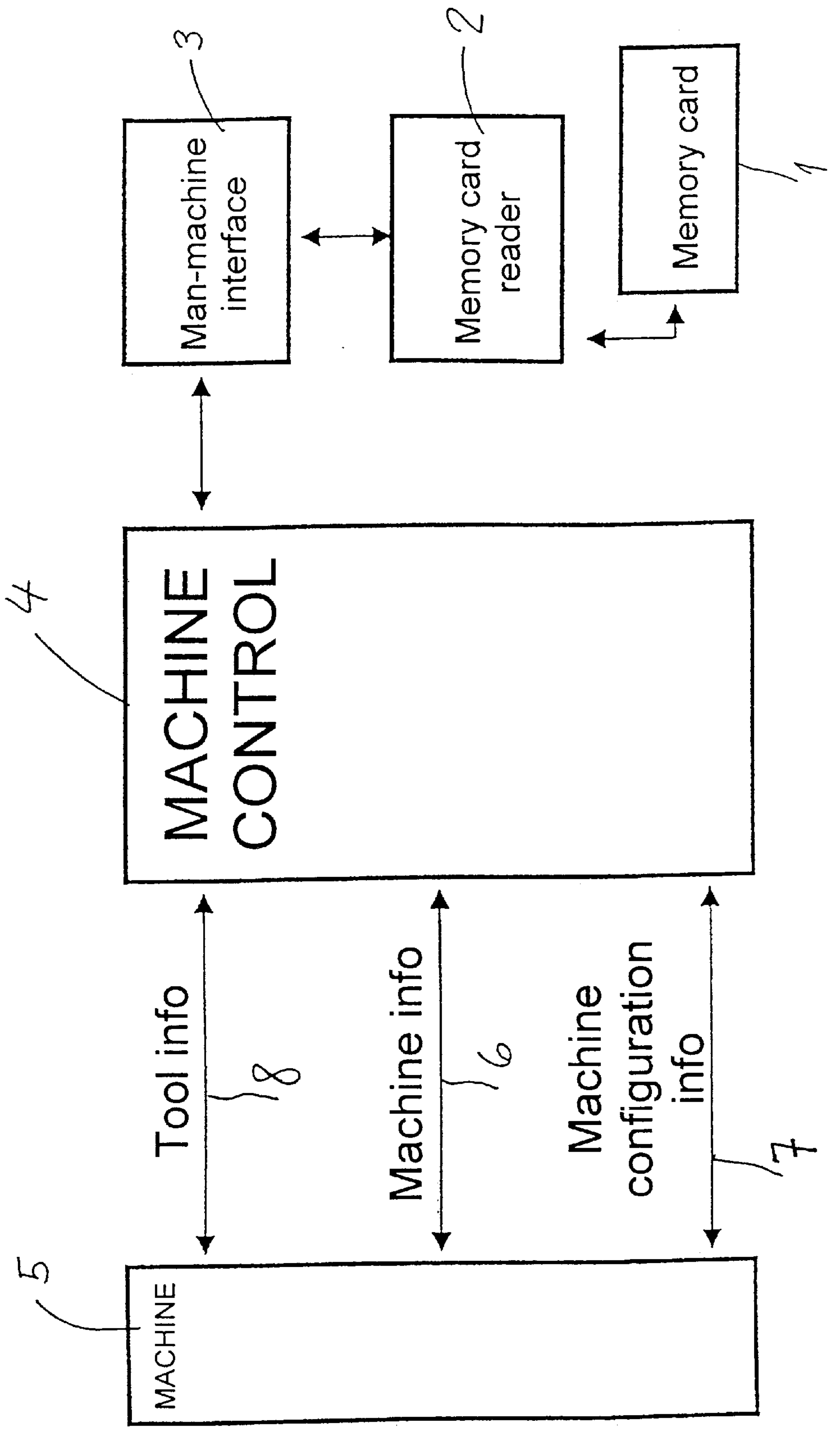
FIG. 1 is a block diagram of the control device.

The control device (FIG. 1) comprises a card bearing the memory, i.e. a chip card comparable in all respects with ordinary credit cards. The card 1 is for inserting into a reader 2 in a unit 3 forming the interface between the operator and the machine 5 and comprising a conventional computer provided with a display screen, a control keyboard and software for controlling the adjustment process in dependence on the menu displayed on the screen, based on data contained in the memory. The menu displayed on the screen enables the operator, using the computer keyboard, to act on the machine control 4 in order to make adjustments in accordance with the job to be performed by the tool associated with the memory and of course previously fitted on the machine. Information goes from the memory read by the computer to the machine 5 via the machine control 4. Information 6 relating to the machine 5, information 7 relating to its configuration and information 8 relating to the tools used are transmitted in the opposite direction, so as to check that the adjustments have been made either automatically in some cases or by the operator in others.

The information 6 relating to the machine 5 can be transmitted to the memory. The information 6 may relate to the length of operation of the machine 5 and/or the number of blanks made, in order to check the wear on the tool. They may relate to maintenance operations on the tool and/or on the machine 5. The memory can also transmit and receive data 7 relating to the configuration of the machine 5.

Figure 2:
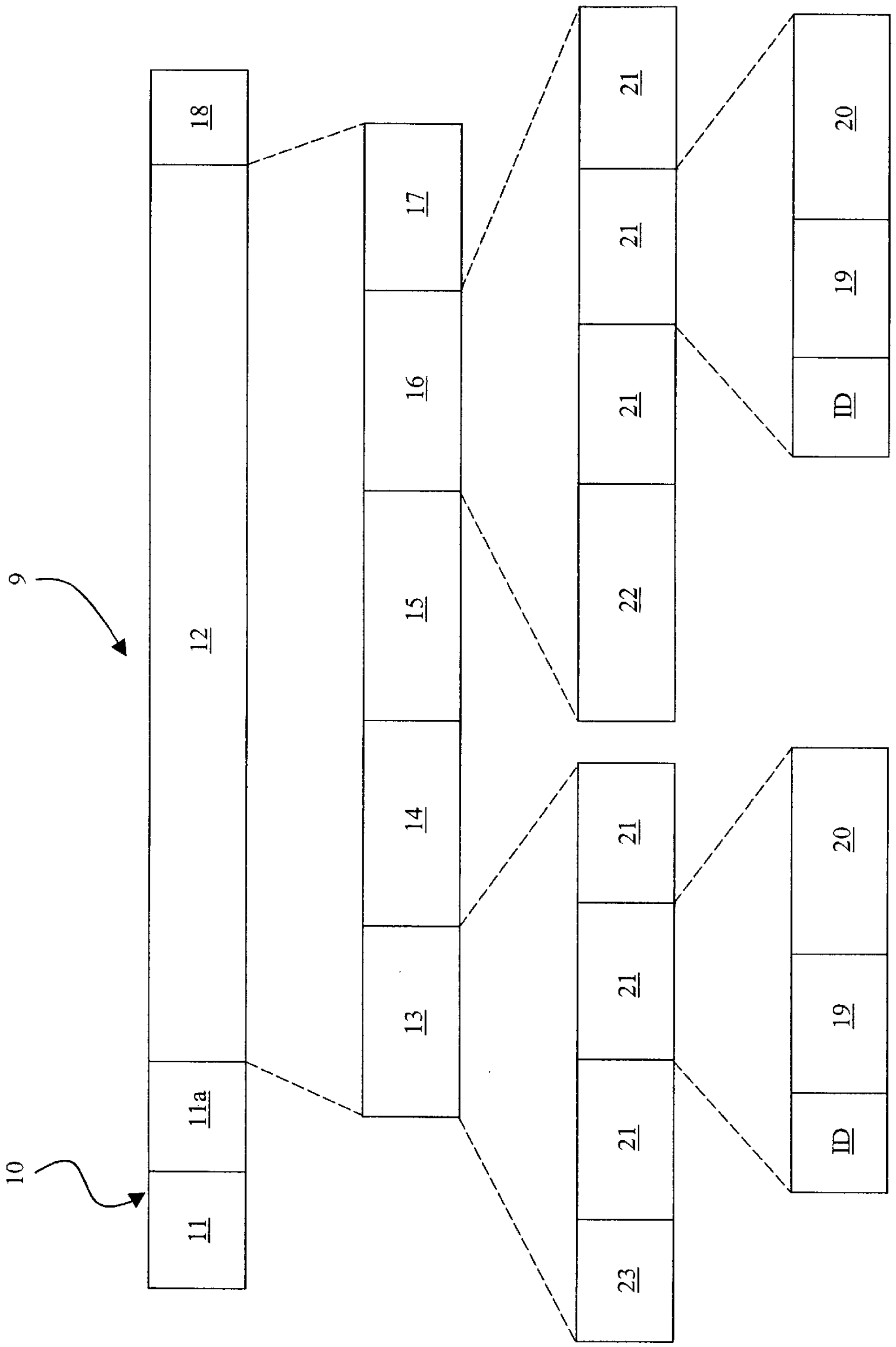
FIG. 2 is a flow chart showing storage of information in the memory of the control device.

We shall now, using FIG. 2, examine a possible organisation format of the memory.

The data are stored in the form of a frame 9 beginning with a heading 10 comprising an item 11 having a length of 4 bytes and giving the total size of the complete frame 9 expressed in bytes (including the heading and the final control sum), followed by information **11*a* measuring 1 byte and giving the particular structure of the frame 9**. (In the present case the byte has a value of 1 and will be incremented if the format described here is subsequently modified.)

The heading is followed by the data zone proper 12, made up of a set of data cells divided inot sections 13–17 having the structure described hereinafter. Each cell contains an elementary datum (numerical datum, the state of the selector, a character chain etc).

The data zone 12 is followed by a last byte 18 or check total, the contents of which is calculated from the data in the heading and the data zone. It ensures that the contents of the memory is coherent and has not been damaged.

Each section in the data zone includes at least one data cell 21 to which is allocated to datum identifier "ID"over two bytes contained in the cell. Thus, each datum in the memory corresponds to a different ID code having a particular meaning. The order in which the data are stored in the memory is arbitrary; the only thing that counts is the ID of each datum, which identifies it unambiguously and thus interprets is. This enables the contents of the memories 1 to be modified at any time by adding or suppressing data without making them illegible on machines where the software is old and has not been updated, or conversely so as to allow a recent machine to read the memories 1 formatted on an old machine. When the memory 1 is read out, the software scans all the data cells on the card 1 and 6 interprets each cell on the bases of the ID of each datum. only data with ID known to the machine software are interpreted; the others can be skipped. If the expected data are not present in the memory 1, the software initialises the corresponding variables at values by default. The datum ID is followed by the value 20 of the actual datum.

The first section 13 of the data zone is called the common data section and includes all data which can be transferred from one machine to another, i.e. adjustments reusable on another machine. The data in the common data section 13 have an ID with a most significant bit value 0. The data specific to each machine, i.e. corresponding to adjustment details which cannot be re-used on another machine (e.g. details measured by a non-absolute coder having a reference given with respect to an end of travel which can be positioned differently on each machine) are recorded in supplementary sections 14, 15, 16, 17 called specific data sections. There may be a number of them in the memory 1, each commencing with a cell 22 containing the serial number of the machine at which the data were added to the card. In this manner, the non-transferrable data will not be erased when the memory is used on a number of different machines, and can be retrieved when the memory 1 is re-used on the machine where the values were initially stored. Data of specific sections 14, 15, 16, 17 always have an ID in which the most significant bit has a value of 1.

Finally the first cell of the common data section 13 contains a variable 23 which defines the class of machine on which the memory can be used, i.e. a set of machines compatible at the level of the tool. Each class of machine has its own specific memories defining the IDs of the data appropriate to it.

What is claimed is:

1. A system for cutting blanks from sheet material, the system comprising a cutting machine which may be set up for performing different cutting tasks according to supplied values of a plurality of setup parameters;

a plurality of cutting tools interchangeably installable on the cutting machine, each tool being configured to cut a blank having a predetermined pattern;

a respective memory device respectively associated with each cutting tool, the memory device being operative to store data relating to characteristics of the associated tool and values of the setup parameters for the tool;

a reader operative to read data from the memory device;

an interface device which cooperates with the reader to display a menu relating to the data read from the memory device; and a controller operative to provide control signals to the cutting machine in accordance with the menu, including values for the setup parameters.

2. A system according to claim 1, wherein the controller is further operative to receive data relating to the cutting machine and to transmit the data to the memory device.

3. A system according to claim 1, wherein the respective memory device comprises a data zone divided into sections, each section including at least one data cell identified by a data identification code.

4. A system according to claim 3, wherein the data identification codes are compatible only with cutting machines on which a cutting tool associated with the respective memory device can be used.

5. A system according to claim 1, wherein the respective memory device is fixed on a support adapted to receive information for identifying a cutting tool with which the respective memory device is associated.

6. A system according to claim 2, wherein the respective memory device is fixed on a support adapted to receive information for identifying a cutting tool with which the respective memory device is associated.

7. A system according to claim 3, wherein the respective memory device is fixed on a support adapted to receive information for identifying a cutting tool with which the respective memory device is associated.

8. A system according to claim 4, wherein the respective memory device is fixed on a support adapted to receive information for identifying a cutting tool with which the respective memory device is associated.

9. A system according to claim 1, wherein the controller is further operative to receive data relating to operations performed by an installed cutting tool, and to transmit the data to the respective memory device.

10. A system according to claim 9, wherein the data includes information relating to a number of cutting operations being performed by an installed cutting tool.

11. A system according to claim 1, wherein the respective memory device is comprised of a card bearing a machine-readable memory medium including data identifying the associated cutting tool.

12. A system according to claim 11, wherein the memory medium is configured to include a data zone divided into sections, each section including at least one data cell identified by a data identification code.

13. A system according to claim 1, wherein the respective memory device is comprised of a machine-readable memory medium attached to the associated cutting tool.

14. A system according to claim 13, wherein the memory medium is configured to include a data zone divided into sections, each section including at least one data cell identified by a data identification code.

15. A cutting tool for use on a cutting machine configurable to perform different cutting tasks, the cutting machine including a reader operative to read data from at least one memory device and an interface device operable to cooperate with the reader to display a menu relating to the data read from the memory device, the cutting tool comprising:

a tool detachably installable on the cutting machine, the tool being configured to cut a blank having a predetermined pattern; and a memory device associated with the tool, the memory device being operative to store data relating to characteristics of the tool and values of setup parameters of the tool; the memory device being configured to couple with the reader of the cutting machine to communicate the data to the cutting machine, the cutting machine being configured to perform a cutting task associated with the tool in accordance with the data communicated by the memory device to the cutting machine.

16. A cutting tool according to claim 15, wherein the memory device is comprised of a card bearing a machine-readable memory medium including data identifying the tool.

17. A cutting tool according to claim 16, wherein the memory medium is configured to include a data zone divided into sections, each section including at least one data cell identified by a data identification code.

18. A cutting tool according to claim 15, wherein the memory device is comprised of a machine-readable memory medium attached to the tool.

19. A cutting tool according to claim 18, wherein the memory medium is configured to include a data zone divided into sections, each section including at least one data cell identified by a data identification code.

20. A cutting tool according to claim 15, wherein the memory device is operative to record and store second data provided by the reading device.

* * * * *